Figure 3:
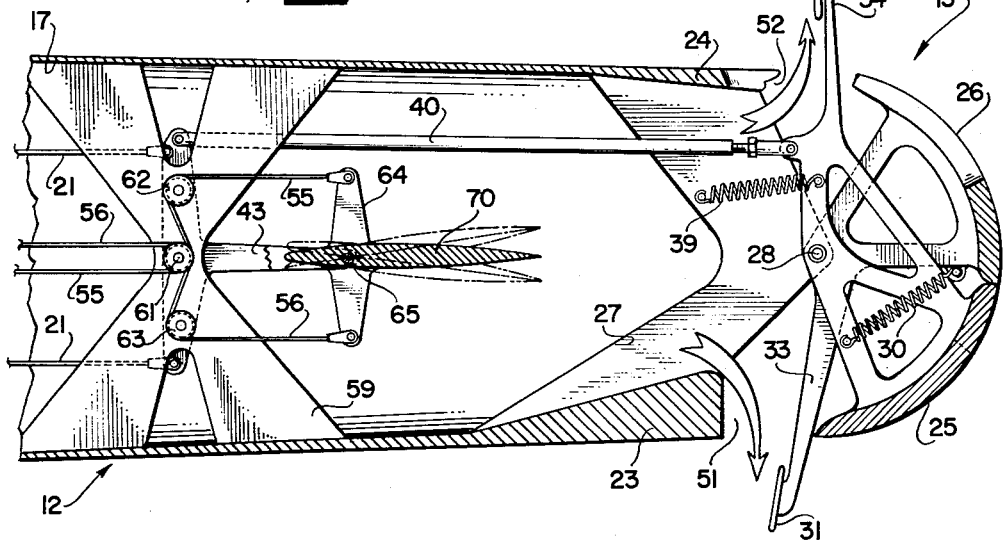

March 20, 1962  C. K. SPEARMAN  3,026,068
YAW AND THRUST CONTROL
Filed March 14, 1960  3 Sheets-Sheet 1
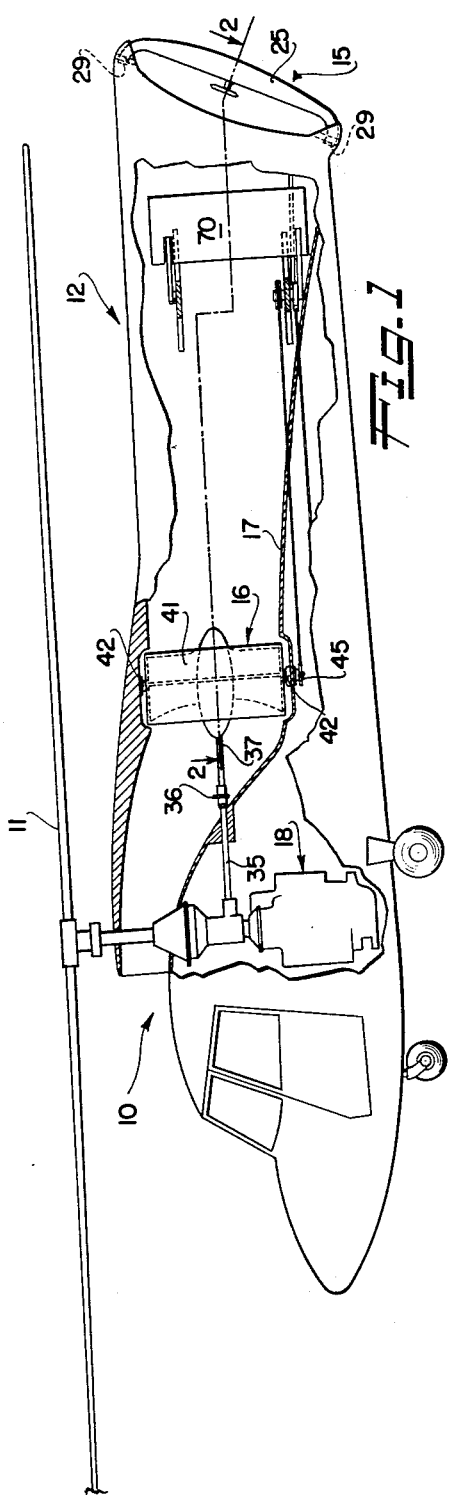
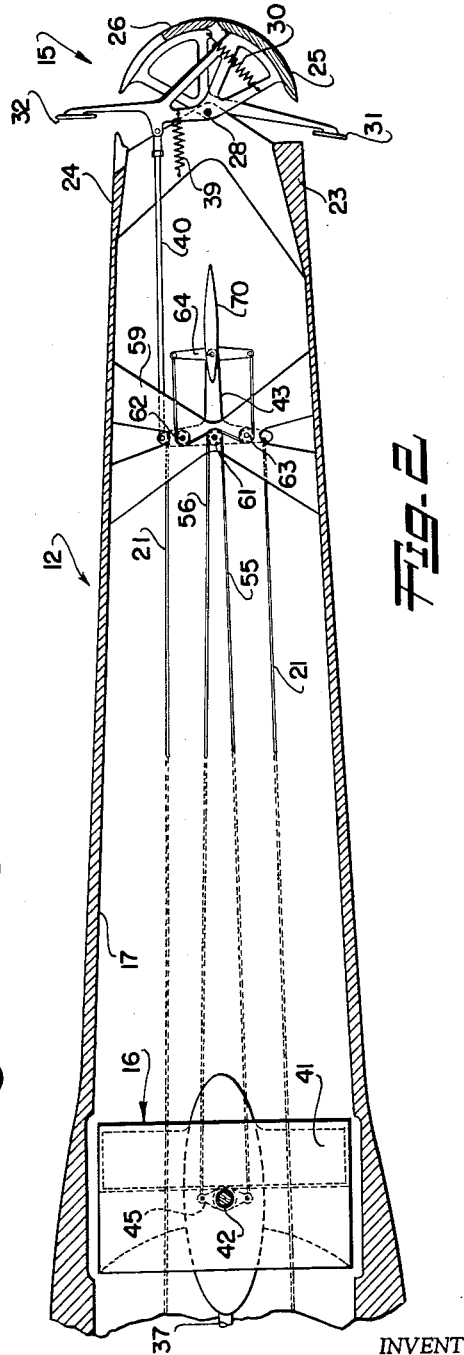
INVENTOR.
CHARLES K. SPEARMAN
BY
George C. Sullivan
Agent March 20, 1962   C. K. SPEARMAN   3,026,068
YAW AND THRUST CONTROL
Filed March 14, 1960   3 Sheets-Sheet 2

INVENTOR.
CHARLES K. SPEARMAN
BY
Agent

March 20, 1962

C. K. SPEARMAN 3,026,068

YAW AND THRUST CONTROL

Filed March 14, 1960

3 Sheets-Sheet 3

INVENTOR.
CHARLES K. SPEARMAN
BY
*George C. Sullivan*
Agent

3,026,068
YAW AND THRUST CONTROL
Charles K. Spearman, Van Nuys, Calif., assignor to Lockheed Aircraft Corporation, Burbank, Calif.
Filed Mar. 14, 1960, Ser. No. 14,735
9 Claims. (Cl. 244—52)

The present invention relates to a yaw control device for an aircraft. More particularly, it relates to automatic yaw control means for a helicopter.

In a vehicle which travels through and is supported by a fluid medium, control means are necessary which are accurate and immediate in their effect because of the devious currents in the fluid medium. This is particularly true in a vehicle which is capable of a wide range of speeds such as a helicopter. Devious air currents caused by gusts of air and swirling from action of the main rotor complicates control of a helicopter. Additionally, most helicopters supported by a large main rotor have an inherent torque problem. The combination of gusty air and rotor torque makes yaw control a difficult matter in a helicopter.

The practice to the present date has generally been to provide the helicopter with a tail boom having a variable pitch tail rotor mounted for rotation about an axis transverse to the longitudinal axis and horizontal to the ground. The pitch of the tail rotor is cyclically controlled to provide yaw forces about the center of gravity or vertical axis of the helicopter.

In co-pending application, Serial Number 14,617 dated March 14, 1960 the problems of using a tail rotor for yaw control were pointed out. These include frequent malfunction due to complexity of parts, vibration, noise, danger due to exteriorally moving parts and the need for high skill in the operator of the aircraft. Additionally where a gust requires a reversal in yaw control forces, there is a delay in application of necessary thrust occasioned because of the required complete change of pitch of the tail rotor.

The invention described in the above mentioned application generally pertains to the use of a stream of high velocity air which is ducted to the aft end of a tail boom of a helicopter and there directed in generally three different directions, either simultaneously or singly, to provide yaw control forces or (when yaw control force requirements are minimum) forward thrust forces.

The present invention utilizes the invention described in the aforementioned application. That application disclosed instantaneous yaw control means but did not supply an answer to the problem of delay due to pilot reaction time between his sensing of yaw deviation and application of correction forces.

It is therefore an important object of the present invention to provide an automatic yaw damping control. Unique gyroscopic means are utilized to sense heading deviations to direct application of proper moment forces to correct those deviations.

It is another important object of the present invention to provide a novel servo means to amplify control forces from the aforementioned gyroscopic means to provide more instantaneous yaw control for an aircraft. A stream of high velocity air is directed about a position removed from the center of gravity. The resultant reaction is utilized for yaw control. The angle of attack of an airfoil member in the stream of high velocity air is controlled by the gyro to amplify forces of the gyroscopic means.

It is another important object of the present invention to provide automatic thrust nozzle control utilizing a differential control nozzle which will, when a high speed condition is reached, automatically direct the yaw control forces in such a direction that they will produce forward thrust. Means extended into the exterior relatively moving air stream are caused to move by it to redirect the thrust forces.

Other objects of the invention will become apparent from a reading of the following specification when taken in conjunction with the appended drawings wherein like numerals indicate like elements.

Figure 4:
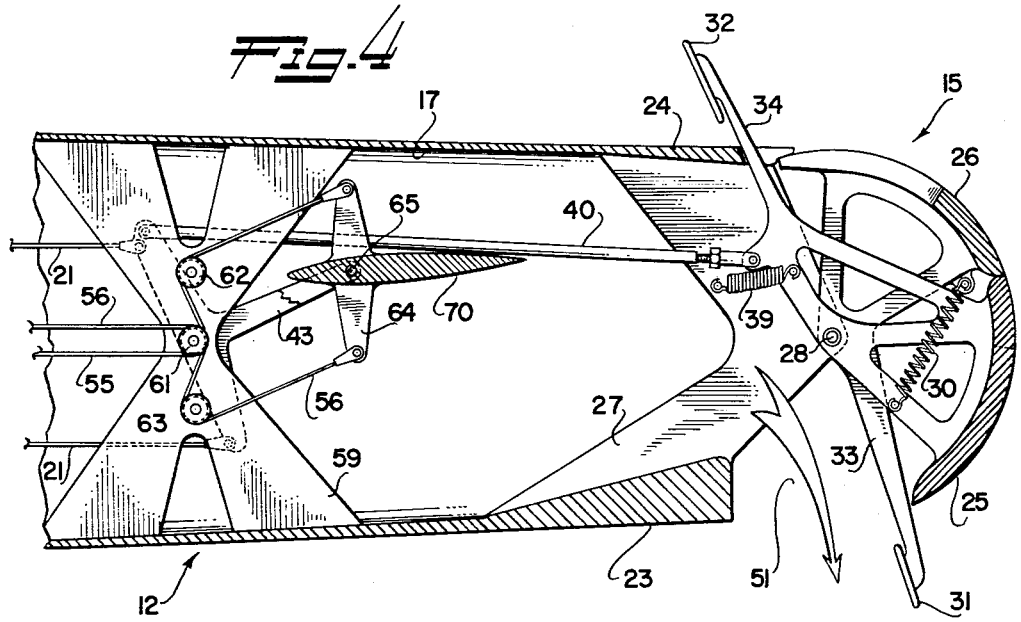
Figure 5:
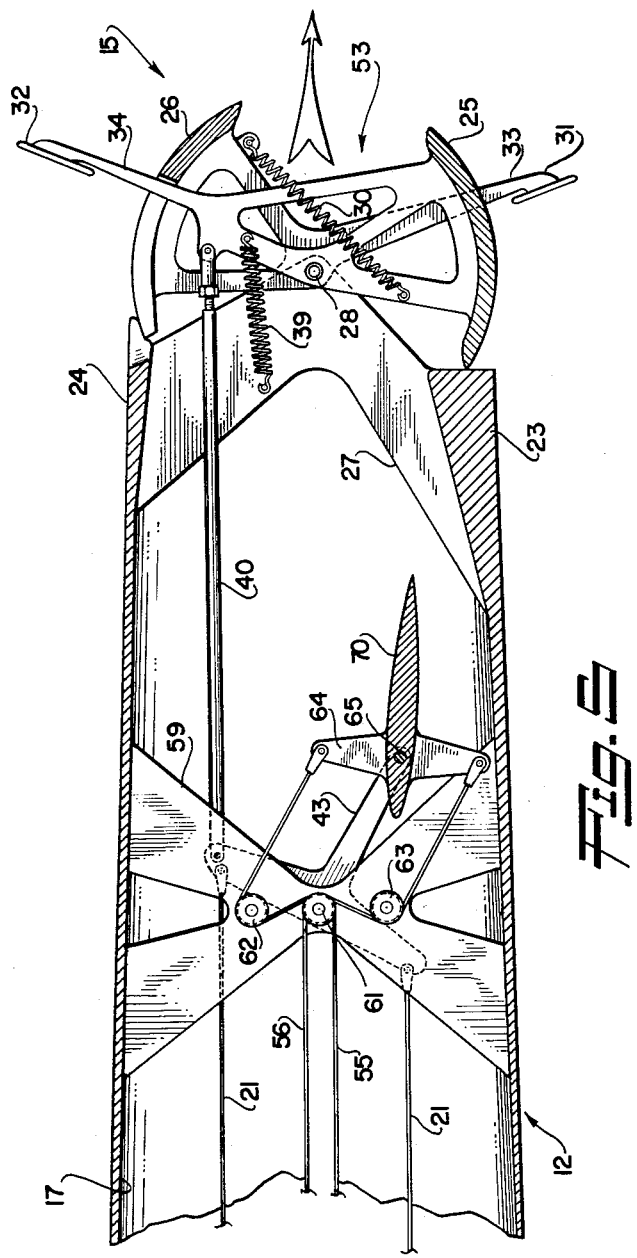

FIG. 1 is a side view of the helicopter embodying the present invention showing the control device.
FIG. 2 is a plan view of FIG. 1.
FIG. 3 is a view taken on lines 3—3 of FIG. 1 showing the thrust directing nozzle in the yaw or transition control position.
FIG. 4 is a view similar to that of FIG. 3 with the nozzle in a hover position.
FIG. 5 is a similar view to that of FIG. 3 with the nozzle in a thrust or high speed position.

The present invention utilizes a source of high velocity air which is conducted to a position spaced from the center of gravity of the helicopter. At that position, the air is jetted or exhausted through a directable nozzle means. The reaction from the exhausted high velocity air causes a counteracting movement of the spaced position about the center of gravity of the helicopter. Instantaneous yaw control forces are provided by a nozzle having doors which will direct air simultaneously to both sides of the tail boom. When yaw forces are needed, the doors are controlled to increase instantly the amount of air passing to one side and at the same time, the amount of air passing to the opposite side of the tail boom is decreased. This provides the advantage of doubling the force effect of a control movement since the increase of one force is coincidental with the decrease in the opposite force.

To provide a source of high velocity air for positive yaw control, a turbine compressor is used. The turbine compressor involves a rotating mass which will tend to maintain its plane of rotation in space as does a gyroscope. This gyroscopic effect may be utilized to provide control forces if the turbine is gimballed or pivoted so that this tendency is permitted to a limited extent. By then providing some means by which a change in angular relation between the aircraft and the gimballed turbine may either be measured or directly applied to the positive yaw control means, yaw damping is achieved without the necessity of additional autopilot parts.

In order that movements in one plane be detected, a gyroscope must be mounted in a cage for rotation in the other plane and gimballed or pivoted at 90 degrees to its rotational axis. That is, if deviations in a horizontal plane are to be detected, the gyro must rotate in a vertical plane (on a horizontal axis). Such is the case with an aircraft where directional control is under consideration. Thus the turbine providing the rotational mass for yaw control if used as a gyro for the damping of yaw must rotate on a horizontal axis. If the axis of rotation of the turbine is parallel to the longitudinal axis of the aircraft, the gimballed axis may either be vertical or horizontal but at 90 degrees to the rotational axis. If the gimballed axis is vertical, the aircraft in yaw will tend to move angularly away from the rotational plane of the turbine. If the gimballed axis is horizontal yaw will cause a force on one end of that axis which will cause precession. The force of the yaw which causes a change in angular relationship between the rotational plane of the turbine and the aircraft may be utilized to operate the yaw control means to cause return to the desired direction or heading.

Driving connections as well as duct means to and from the turbine compressor restrict the limits of its movement with respect to the craft. The compressor being restricted in the amount of movement is provided with additional aerodynamic servo means which amplifies the precessional force. The aerodynamic servo consists of an airfoil interposed in the stream of high velocity air between the compressor and the nozzle means. The angle of attack of the airfoil with respect to the stream of air is controlled by the compressor acting as a gyro. The motion due to lift on one side or the other of the airfoil by reason of the passage of the high velocity air past it will be transmitted through a system of levers to direct the nozzle.

Because of the effect of devious fluid currents about a helicopter, it has been the practice to construct the tail boom of a helicopter in skeleton for as much as possible to minimize the effect of lateral forces. By using the aerodynamic servo in conjunction with the gyroscopic system comprised herein of a gimballed compressor, it is possible to provide stable yaw control for even the helicopter with a tail boom having a large fin area. The tail boom which does have a large fin area is useful in high forward speeds to maintain itself parallel to the path of travel. During high speed flight, the high velocity air may be directed to a path substantially parallel with the path of travel so that its reaction will aid and add to the thrust of the aircraft. This is done by providing directing doors at the yaw control nozzle which are divided so that they may separate and direct the high velocity air generally aft. This has been described in my above mentioned co-pending application, Serial Number 14,617 dated March 14, 1960. In that application, manual means are provided so that the doors may be separated to provide the thrust for high speed flight. The present invention makes possible elimination of the manual control means and provides in their stead an automatic thrust nozzle control which effectively senses the forward speed of the aircraft to open the doors to provide the thrust function.

In FIG. 1, the helicopter 10 is shown with the main rotor 11 to provide lift and forces for horizontal motion. The tail boom 12, it will be noted, has a relatively large fin area. To date, helicopter tail booms have generally been of skeleton construction as much as possible to prevent the influences of gusty air blowing the craft from its heading. However, the tail boom which has a large fin area is advantageous for directional control during high speed flight. The present invention makes possible the use of a tail boom having a large area by means of accurate and quick acting yaw correction means. Yaw control means is shown as nozzle 15 at the aft end of the tail boom 12 which is the point furthest removed from the center of gravity (generally through the rotational axis of the main rotor 11). High velocity air is provided by rotary turbine compressor 16. This high velocity air is ducted through duct 17 to nozzle 15. A conventional engine 18 provides power for the main rotor 11 and to the compressor 16 through power takeoff shafts 35 and 37 connected by a flexible coupling 36. An additional flexible coupling (not shown) is provided between shaft 37 and compressor 16 to permit its rotation about a vertical axis for purposes described later. The walls of tail boom 12 at its aft end are terminated to form an opening through which the high velocity air from the turbine 16 is conducted. The area defined by the opening is partially closed by the doors 25 and 26 which extend from the top to the bottom of the boom and are pivoted on axis 28 in bearings 29. Each door 25 and 26 has an arcuate cross section, each closes or covers about a 90 degree arc about the pivotal axis 28. As can be seen from an examination of FIG. 3 the doors 25 and 26 can be moved from an abutting relationship with each other to an abutting relation with the adjacent sidewalls 23 and 24 as in FIG. 5. The spring 30 fixed to the door 26 and the door 25 biases them together.

During all conditions of flight except that of the high forward speed, the doors 25 and 26 will be in abutting relationship with each other. They will be controlled about the pivotal axis 28 to divert air through either or both openings 51 and 52 to exert the proper yaw forces. During hover or low forward speed, the doors will assume a position shown in FIG. 4. At hover, the large fin area of the tail boom 12 offers no stabilizing influence. Therefore, any forces which are to overcome devious air currents or the torque of the main rotor 11 must be supplied at the end of the tail boom 12 from nozzle 15. Since in hover the largest force which must be contended with is the torque from the main rotor, the door combination 25 and 26 in abutting relationship will be nearly or against the wall 24. As the speed of the helicopter increases, the aerodynamic forces on the fin area of the boom begin to take effect so that less of a moment about the center of gravity of the tail boom is required to maintain fore and aft or heading. The position of the doors 25 and 26 is shown in FIG. 3. Even in this state of flight, the volume of air passing to the opening 51 must be larger than the volume passing through 52 to overcome the rotor torque.

It will be noted that as one opening is closed, the other opening is open a like amount. This results in a doubling of the force effect. That is, as the opening 52 is closed, the opening 51 is opened a like amount, thus a unit of movement of the doors 25 and 26 results in an increase of moment counterclockwise around the center of gravity due to the increased volume of air passing through the opening 51. At the same time, there is a decrease of moment clockwise about the center of gravity due to a decrease of air passing through opening 52. This increase and decrease in moment about the center of gravity combine to double the effect of either one individually.

Automatic thrust control is achieved by drag discs 31 and 32 extended exteriorly into the relatively moving air. Disc 31 is fixed to move with the opposite door 26 by means of arm 33. Disc 32 is fixed to door 25 through arm 34. As the speed of flight increases, the pressure upon the discs 31 and 32 is increased until finally the effect of spring 30 is overcome and the doors 25 and 26 are separated so that they now abut the walls 23 and 24 of tail boom 12. Spring 39 biases the door combination counterclockwise so that there is always a tendency to open 51. Since the pressure on disc 32 must overcome the effect of spring 39 the arm 34 is longer than arm 33 and disc 32 is larger than disc 31. A cable system similar to that shown in co-pending application, Serial Number 14,617 dated March 14, 1960 may be substituted for the automatic feature in discs 31 and 32.

In this position, the high velocity air will be directed substantially straight aft for forward thrust. Heading control will be supplied largely by the fin area of boom 12. The torque of rotor 11 will remain. It will be noted from observation of FIG. 5 that the opening 53 is slightly left of the longitudinal axis of the helicopter. The helicopter shown is one with a counter-rotating main rotor 11. This is made possible by terminating wall 23 forward of wall 24 of tail boom 12.

The doors 25 and 26 are controlled through link 40 which is pivoted to the T-shaped bellcrank and the door 25. Conventional cables from a rudder in the cockpit of the craft may control the T-shaped bellcrank 43 to operate the doors 25 and 26. The doors are also controllable by moving the stem of the T-shaped bellcrank 43. Movement of the stem is effected by changing the angle of attack of the airfoil 70 with respect to the relatively moving air from compressor 16. The compressor 16 includes a shroud 41 which is pivoted for movement about a vertical axis in bearings 42.

Fixed to the bottom of shroud 41 is cross arm 45. Attached to the ends of cross arm 45 are the cables 55 and 56 which extend around the pulley 61, pulleys 62 and 63 (all of which are pivoted on structural support 59) and are fixed to the ends of cross arm 64 to which is fixed the symmetrical airfoil 70. Arm 64 is in turn pivoted at 65 on the stem of the T-shaped bellcrank at 65. Airfoil 70 is pivoted at its aerodynamic center so that minimum movement is required to move it.

The turbine compressor 16 is a rotating body which will tend to maintain its plane of rotation in space. Therefore, when the tail boom 12 moves about the vertical axis of the helicopter, it also moves substantially about the gimbal axis of the turbine 16. When the boom moves in a clockwise direction as viewed in FIGURE 2, the compressor 16 would move relatively counterclockwise. This relative movement will cause cable 56 to move forward and the cable 55 to move aft. The airfoil 70 has a relatively large vertical area or span as can be seen from FIGURE 1. As the cable 55 moves aft and the cable 56 forward, the cross arm 64 fixed to the airfoil 70 will move in a clockwise direction about its pivot 65. The high velocity air from compressor 16 past airfoil 70 will cause increased pressure on the left side and a decreased pressure on the right side. It will move to the right pulling with it the stem of bellcrank 43 generally in the direction toward that position shown in FIGURE 4. By the same reasoning if the tail boom of the helicopter were to yaw so that it moved counterclockwise about the center of gravity of the craft, the airfoil 70 would be angled toward the left creating a movement of the stem of bellcrank 43 clockwise about its pivot axis to cause the door combination 25 and 26 to move clockwise about pivot 28 decreasing the thrust vector through the opening 51 and increasing it through the opening 52 to cause movement of the tail boom back about its center of gravity in a clockwise direction as viewed in FIG. 2.

A novel yaw damping and thrust control means for a vehicle which moves through a fluid medium has been disclosed. It has been shown herein as used on a helicopter but it is not intended to be restricted to use on that craft. The usefulness of the invention extends to any craft which travels in a medium permitting unrestricted movements including conventional aircraft, those which travel in space and underwater vehicles. Additionally, the concept may be used to exert control forces for movements about the longitudinal and lateral axes of a craft as well as about the vertical axis as herein described.

Having disclosed the details of my device, I claim the following combination of elements and their equivalents as my invention to which I desire the protection of a United States Letter Patent.

What is claimed is:

1. Control means for a vehicle comprised of means to produce a high velocity fluid, nozzle means at a position spaced from the center of gravity of said vehicle, duct means from said means to produce a high velocity fluid to said nozzle means, means responsive to rotational movements about said center of gravity to direct said nozzle means in such a direction that said high velocity air passing through said nozzle will counteract said rotational movement and means responsive to high speed of said vehicle in a direction from said position to said center of gravity to direct said nozzle means oppositely to said direction to provide additional forward thrust.

2. Control means for a vehicle comprised of means to produce a high velocity fluid, nozzle means at a position spaced from the center of gravity of said vehicle, pivot means for said nozzle means, duct means from said means to produce a high velocity fluid to said nozzle means, means to sense movement of said vehicle about an axis through said center of gravity, means responsive to said movement to rotate said nozzle means about said pivot means to direct said high velocity air laterally to counteract said movement, and means responsive to high forward speed of said vehicle to rotate said nozzle means to direct said high velocity fluid substantially parallel to a line from said center of gravity to said position.

3. Control means for a vehicle comprised of rotary means to produce a high velocity fluid, nozzle means at a position spaced from the center of gravity of said vehicle, pivot means for said nozzle means to permit oscillation about an axis formed by said pivot means, duct means from said rotary means to said nozzle means, means to oscillate said nozzle about its pivot axis, airfoil means in said duct means, means to permit movement of said airfoil means, gyroscopic means responsive to movements about an axis of said vehicle substantially parallel to said pivot axis of said nozzle to change the angle of attack of said airfoil means relative to said high velocity fluid passing through said duct means, means responsive to movement of said airfoil by reason of said change in angle of attack to direct said nozzle means so that the reaction of said high velocity fluid passing through said nozzle means will counteract said movement about said axis of said vehicle.

4. Control means for a vehicle comprised of rotary means to produce a high velocity fluid, nozzle means at a position spaced from the center of gravity of said vehicle, pivot means forming a pivotal axis for said nozzle means, duct means from said rotary means to said nozzle means so that said high velocity fluid will be passed from said rotary means through said duct through said nozzle means, shroud means for said rotary means in which said rotary means will rotate, gimbal means for said shroud means on an axis substantially perpendicular to the pivotal axis of said rotary means, airfoil means in said duct means, means to permit lateral movement of said airfoil means, means responsive to lateral movement of said airfoil means to move said nozzle means about its pivotal axis, means responsive to movement of said vehicle about said gimbal axis to cause said airfoil means to change its angle of attack resulting in lateral movement in said duct means so that said nozzle means will be directed in such a manner that reaction from said high velocity fluid will counteract said movement of said vehicle about said gimbal axis.

5. Control means for an aircraft comprised of rotary means to accelerate air to a high velocity, gimbal means for said rotary means to permit limited movement about an axis of said rotary means other than its rotational axis, nozzle means at a position spaced from the center of gravity of said vehicle, duct means from said rotary means to said nozzle means to conduct said high velocity air through said nozzle means, pivot means for said nozzle means to permit said nozzle means to oscillate about a pivotal axis formed by said pivot means, an airfoil in said duct means, means to permit said airfoil to move transversely across said duct means, means responsive to transverse movement of said airfoil means to direct said nozzle means about its said pivotal axis, means responsive to limited movement of said rotary means with respect to said vehicle about said gimbal means to vary the angle of attack of said airfoil means in said duct means to cause said airfoil means to move transversely to said duct means to direct said nozzle means so that the reaction from said high velocity fluid will counteract the relative movement between said rotary means and said vehicle.

6. Yaw control means for an aircraft comprised of a rotary compressor to provide a source of high velocity air, said compressor rotating on a horizontal axis, gimbal means for said rotary compressor on an axis 90 degrees from said rotational axis, nozzle means at a position spaced from the center of gravity of said aircraft, pivot means on a substantially vertical axis for said nozzle means, a duct from said compressor to said nozzle, an airfoil in said duct, means to permit said airfoil to move substantially transverse to said duct, means responsive to transverse movement of said airfoil to move said nozzle about its pivotal axis, pivot means for said airfoil at its center of pressure, means responsive to relative movement between said aircraft and said rotary compressor about said gimbal axis to pivot said airfoil to alter its angle of attack with respect to said high velocity air so that it will move transversely to said duct so that said nozzle means will be directed in such a manner that said relative movement between said aircraft and said rotary compressor about said gimbal axis will be counteracted.

7. Control means for a vehicle comprised of a source of high velocity air, duct means from said source to a position spaced from the center of gravity of said vehicle, said duct means terminating at a position in a plane substantially perpendicular to the axis of said duct means to define an opening, a pair of closure doors, the area of each said doors being equal, the total area of said pair of closure doors being less than the area of said opening, pivot means for said doors on an axis substantially perpendicular to a line from the center of gravity of said vehicle and said position, means to bias said pair of doors into abutting relation, means to move said pair of doors as a unit about said pivot means, means responsive to relatively high forward speed of said vehicle to move each of said pair of doors away from each other to each side of said opening so that high velocity air is conducted opposite and substantially parallel to the path of movement of said vehicle to provide forward thrust.

8. Control means for a vehicle comprised of a source of high velocity air, duct means from said source to a position spaced from the center of gravity of said vehicle, said duct means terminating at said position in a plane substantially perpendicular to the axis of said duct means to define an opening, a pair of closure doors of equal area, the total area of said pair of closure doors being less than the area of said opening, pivot means for said doors on an axis substantially perpendicular to a line from the center of gravity of said vehicle to said position, means to move said pair of doors as a unit about said pivot means so that said high velocity air is directed to one or the other side of said opening or both sides simultaneously, means to bias said doors together, an arm fixed to each of said pair of doors and extending to the exterior of said vehicle, a drag disc on the exterior end of each arm so that high forward velocity of said vehicle will create a pressure against said drag discs to cause its respective door to move about said pivotal axis to the opposite side of said opening so that said high velocity air will be conducted in a path substantially parallel to the path of travel of said vehicle but in an opposite direction thereto to produce a thrust.

9. Yaw control means for an aircraft comprised of a rotary compressor to provide a source of high velocity air, said compressor rotating on a horizontal axis, gimbal means for said rotary compressor on an axis 90 degrees from said rotational axis, a duct from said rotary compressor to a position spaced from the center of gravity of said aircraft, said duct terminating at said position in a plane substantially perpendicular to the axis of said duct to define an opening, a pair of closure doors of equal area, the total area of said closure doors being less than the area of said opening, pivot means for said doors on an axis substantially parallel to the plane of termination of said duct at said position, means to move said pair of doors as a unit about said pivot means so that said high velocity air is directed to one or the other side of said opening or both sides simultaneously, means to bias said doors together, an airfoil in said duct, means to permit said airfoil to move substantially transverse to said duct, means responsive to transverse movement of said airfoil to move said pair of doors about its pivot axis, pivot means for said airfoil at its center of pressure, means responsive to relative movement between said aircraft and said rotary compressor about said gimbal axis to pivot said airfoil to alter its angle of attack with respect to said high velocity air moving relative thereto so that it will move transversely to said duct so that said nozzle means will be directed in such a manner that said relative movement between said aircraft and said rotary compressor at said gimbal axis will be counteracted, an arm fixed to each of said pair of doors and extending to the exterior of said aircraft, a drag disc on the exterior end of each arm so that high forward velocity of said aircraft will create an aerodynamic pressure against said drag disc to cause its respective door to move about its pivot axis to the opposite side of said opening so that said high velocity air will be conducted between said doors in a path substantially parallel to the path of travel of said vehicle but in an opposite direction thereto to produce a thrust.

References Cited in the file of this patent

UNITED STATES PATENTS

| | | |
|---|---|---|
| 2,167,533 | Solomon | July 25, 1939 |
| 2,433,251 | Whiting | Dec. 23, 1947 |
| 2,518,697 | Lee | Aug. 15, 1950 |